2 Sheets—Sheet 1.
T. ALSOP.
Windmill.
No. 215,036. Patented May 6, 1879.
Fig: 1.
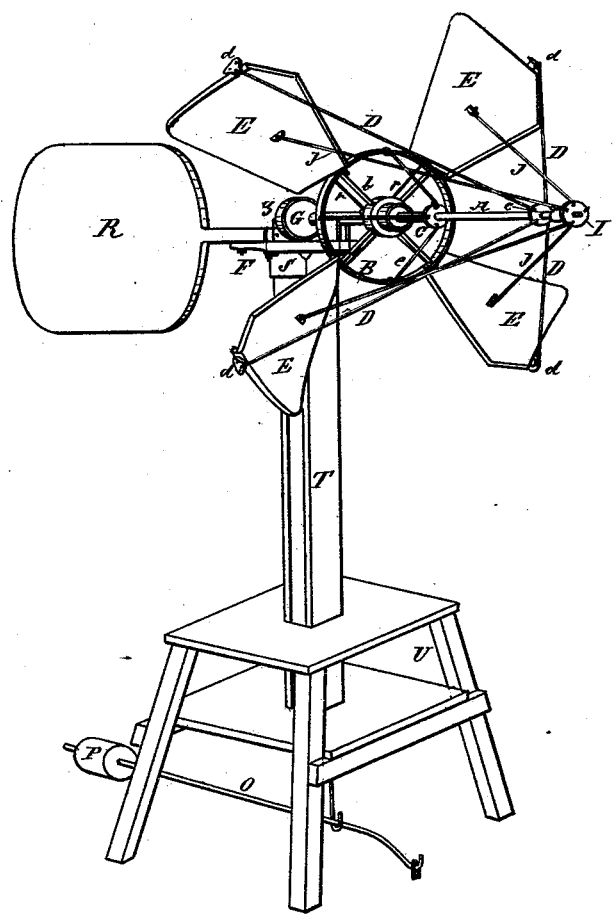
Fig: 2.
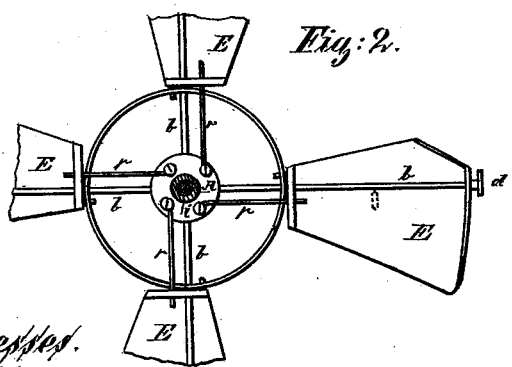
Fig: 3.
Witnesses.
Ernst Jebsen
Emil H. Frommann
Inventor.
Thomas Alsop
By Wm. H. Lotz
Attorney

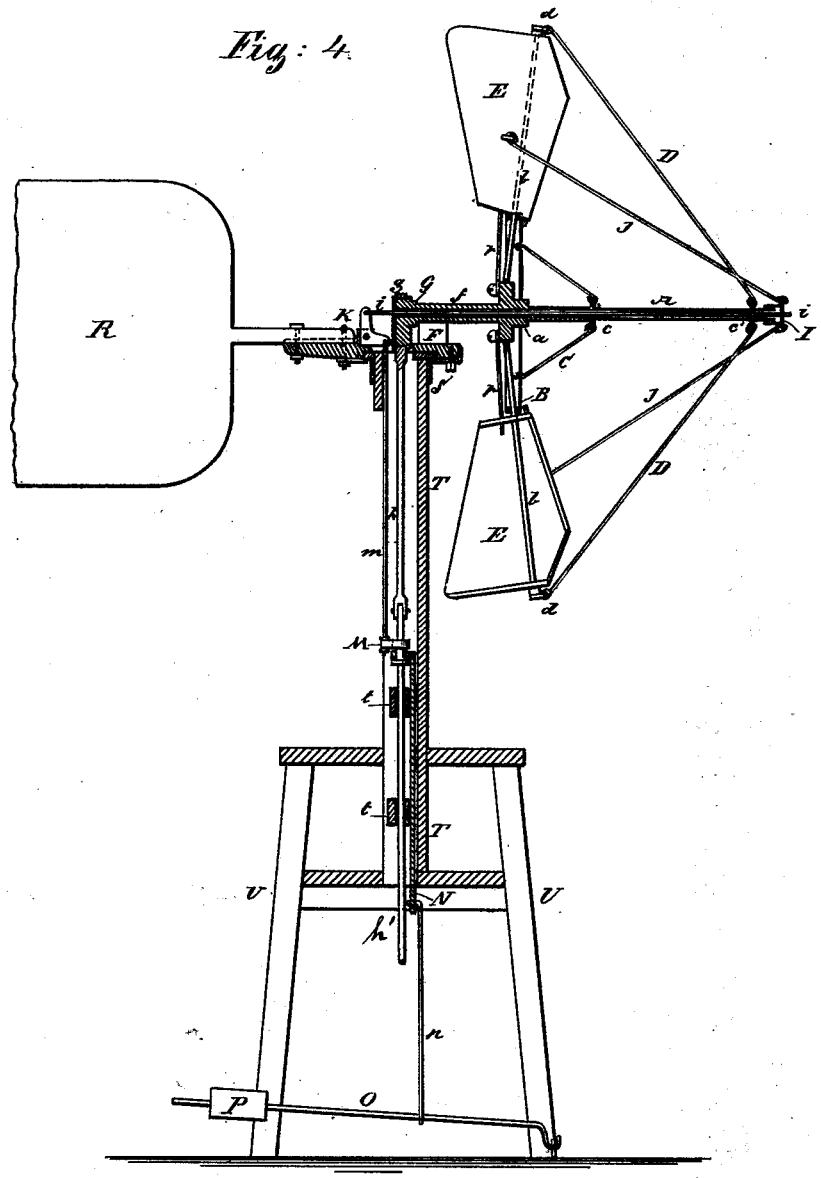

ary 10, 1879.

UNITED STATES PATENT OFFICE.

THOMAS ALSOP, OF ELKHART CITY, ILLINOIS.

IMPROVEMENT IN WINDMILLS.

Specification forming part of Letters Patent No. 215,036, dated May 6, 1879; application filed February 10, 1879.

*To all whom it may concern:*

Be it known that I, THOMAS ALSOP, of Elkhart City, in the county of Logan and State of Illinois, have invented certain new and useful Improvements in Windmills; and I do hereby declare that the following is a full, clear, and exact description thereof, reference being had to the accompanying drawings, and to the letters of reference marked thereon, making part of this specification.

The nature of my invention consists in the construction and arrangement of a windmill, in which the pivotal sails are so connected with a weighted lever near the ground that they will yield to face a high wind at a more acute angle than a light wind, and thus be self-adjusting for turning the wind-wheel at a uniform speed, as will be hereinafter more fully set forth.

In order to enable others skilled in the art to which my invention appertains to make and use the same, I will now proceed to describe its construction and operation, referring to the annexed drawings, in which—

Figure 1 represents a perspective view of the windmill. Fig. 2 represents a front elevation of the wind-wheel; Fig. 3, a cross-section of one of the sails, and Fig. 4 a longitudinal vertical section through the center of the windmill.

A is the hollow wheel-shaft, preferably made of gas-pipe in sections, so as to decrease the diameter toward its exterior end. Upon this shaft is mounted the wheel-hub $a$, provided with radial arms $b$ at equal distance apart, which arms are braced and steadied by being passed through a ring, B, connected by diagonal rods C to a collar, $c$, of shaft A. The ends of these radial arms are pivoted in socket-loops $d$, connected to collar $c'$, near the extreme outward end of shaft A, by diagonal rods D.

The sails E are slightly curved, and have flanges to the rear of their ends, through holes in which the radial arms $b$ are passed, so that these sails are free to rotate thereon. These pivotal joints are placed on a line at about one-third of the entire width of the sail, so as to present about twice the surface to the wind on one side of their pivot than on the other, and their narrow surface side has sufficient material added for counterbalancing the wide surface side of said sail.

The shaft A is pivoted in a sleeve-bearing, $f$, which forms part of the turn-table F, and its extremity of largest diameter carries an eccentric, G, the strap $g$ upon which is coupled to the vertical pump connecting rod $h$, which is connected to the pump-rod $h'$.

A rod, $i$, placed longitudinally through the tubular shaft A, with one end forms a pivotal connection with a sleeve, I, arranged to slide upon the extreme end of the shaft A. This sleeve I has a flange, which, by rods J, is connected to projecting loops on about the center of the several sails in such a manner that a reciprocating movement of rod $i$ and sleeve I will transmit an oscillating motion to the sails, and vice versa. The inward end of this rod $i$ is coupled to the upper end of the vertical arm of a bell-crank, K, pivoted on its apex upon the turn-table F, so that its vertical arm is in line with shaft A, and the horizontal arm of this bell-crank, by a rod, $m$, is connected to a rectangular extension of a sleeve, M, loosely placed over the pump-rod $h'$, to be vertically guided and to have a free sliding movement thereon. This lever M has a collar on its lower end, which engages with the upper rectangular projecting bifurcated end of a vertical plate, N, forming a swivel-joint therewith. This plate N has a free up-and-down sliding motion with the sleeve M, and is connected by a rod, $n$, with a lever, O, carrying a removable and sliding weight, P, which can be adjusted to give more or less tension to the rods $m$ and $n$, thence to the rod $i$, and thence by rods J to the sails, holding the latter yieldingly at their most obtuse angle with the direction of the wind.

Spring-bars $r$ are secured at one end to the hub $a$ of the wheel, and are connected at their opposite ends, in any suitable manner, to the sails E, operating as a counterpoise to the action of the weight P, so as to take up any lost motion in the several rod-joints, and by removing the weight P from the lever O, these springs by their action will turn the sails edgewise to the wind, and will thereby stop the motion of the wheel at once.

The turn-table F carries a vane, R, in the usual manner, for adjusting and holding the wheel squarely to the line of the wind; and this turn-table is arranged to rotate upon a cap-plate, s, mounted upon a hollow column, T, in which the pump-rod h is guided in boxes t, and the rod m, sleeve M, and plate N are located, and which may be provided with a door for the purpose of inspecting and lubricating these internal connections. This column T is secured in a suitable base-frame, U.

The peculiar device consisting of the sidewise-pivotal connections of the sails E with the radial arms b of the wheel, to offer a proportionally much larger area to the wind at one side of the pivots than at the other, and the connection of said sails with a weighted lever located near the ground, and therefore in easy reach for adjustment, so as to counterbalance therewith the sideward over-pressure of the wind upon the sails, will be found of great advantage. The sails will not only yield edgewise to a high wind, and therefore will travel at a uniform speed with fluctuating wind-pressure, but besides this the speed of the wheel can be varied instantly by moving the weight farther away or nearer to the fulcrum of the lever O, thereby increasing or decreasing the resisting force of the sails; or by propping the weight or by removing the same entirely the motion of the wheel may be stopped entirely. Therefore where, by the power of this wheel, water is to be raised into a tank, the weight P may be constructed like a float, to rise and fall with the surface of the water, and thereby to stop and start the wind-wheel, according to the supply of water in said tank; or the weight P may be connected with a bucket as a counterpoise to said weight, to be filled from the overflow of the tank, (when said bucket will counteract the power of the weight,) and to be emptied by a float in the tank, so connected with a small valve in the bottom of the bucket that its sinking will raise said valve and will empty said bucket.

Where my above-described windmill is to be used for driving a feed-cutter or other rotating machinery, and therefore has to be arranged with an upright shaft and bevel-gearing in place of the eccentric and pump-rod, the sleeve M is to be placed upon the upright shaft in the same manner and for the same purpose as described heretofore in connection with the pump-rod.

For the spring-bars r, I can substitute any other kind of spring without materially changing the construction of the wheel.

What I claim as my invention, and desire to secure by Letters Patent, is—

1. The herein-described wind-wheel, mounted on a hollow shaft, A, having flanges c and c', and being composed of hub a, radial arms b, ring D, socket-loops d, brace-rods C and D, and pivotal sails E, arranged to be held to the wind by a weighted lever, O, substantially in the manner set forth.

2. The hollow shaft A, wheel-hub a, with arms b, and sidewise-pivotal sails E, in combination with rods J, sleeve I, rod i, and bell-crank K, which latter being coupled by suitable swivel-connections to a weighted lever, O, at or near the ground, constructed and arranged substantially as set forth.

3. In a windmill having a wheel mounted upon a hollow shaft, A, and sidewise-pivotal sails E, connected with the bell-crank K by rods i, sleeve I, and rods J, the swivel-connection between said bell-crank and a weighted lever, O, consisting of rod m, sleeve M upon pump-rod h', and plate N, constructed and arranged within the tower-frame T, substantially in the manner set forth.

THOMAS ALSOP.

Witnesses:
 EMIL H. FROMMANN,
 GEO. FROMMANN.